US010331334B2

(12) United States Patent
Paek et al.

(10) Patent No.: US 10,331,334 B2
(45) Date of Patent: Jun. 25, 2019

(54) MULTIPLE TRANSPARENT ANNOTATION LAYERS FOR USE WITHIN A GRAPHICAL USER INTERFACE

(71) Applicant: Samsung Electronics Co., Ltd., Gyeonggi-do (KR)

(72) Inventors: Chi Hyeon Paek, Seoul (KR); Pyeong Gyu Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 655 days.

(21) Appl. No.: 14/678,242

(22) Filed: Apr. 3, 2015

(65) Prior Publication Data

US 2015/0286392 A1   Oct. 8, 2015

(30) Foreign Application Priority Data

Apr. 3, 2014   (KR) .................. 10-2014-0039759

(51) Int. Cl.
*G06F 3/0488*   (2013.01)
(52) U.S. Cl.
CPC ............... *G06F 3/04883* (2013.01); *G06F 2203/04806* (2013.01)
(58) Field of Classification Search
CPC ............... G06F 3/04883; G06F 2203/04806
See application file for complete search history.

(56) References Cited

U.S. PATENT DOCUMENTS

| 6,342,906 B1* | 1/2002 | Kumar ..................... G06F 3/038 709/201 |
| 8,166,388 B2 | 4/2012 | Gounares et al. |
| 2003/0214506 A1* | 11/2003 | Koselj ..................... G06T 11/203 345/519 |
| 2003/0217336 A1 | 11/2003 | Gounares et al. |
| 2004/0017375 A1* | 1/2004 | Lui ......................... G06F 3/0488 345/581 |
| 2005/0289452 A1* | 12/2005 | Kashi ...................... G06F 17/2247 715/232 |
| 2006/0136813 A1* | 6/2006 | Hong ....................... G06F 17/241 715/232 |
| 2012/0306749 A1* | 12/2012 | Liu .......................... G06F 3/0488 345/163 |
| 2015/0253877 A1* | 9/2015 | Roper ..................... G06F 3/03545 345/179 |
| 2015/0279074 A1* | 10/2015 | Xiong ..................... G06F 3/0418 345/629 |

* cited by examiner

Primary Examiner — Eric J. Bycer
(74) Attorney, Agent, or Firm — The Farrell Law Firm, P.C.

(57) ABSTRACT

A method and an electronic device for displaying content of an application combined with written data are provided. The electronic device includes an input unit configured to receive written data from a user, and a display unit configured to display an application execution screen of an application on a first layer, display a first written data on a second layer disposed on an upper side of the first layer, and display a second written data on a third layer disposed on an upper side of the second layer, where the display unit is further configured to display written data included in a content displaying region of the application execution screen, from among the first written data and the second written data, the content displaying region is a region on which content is displayed on the application execution screen, and the first written data and the second written data is editable based on a user command, and storable independently from the application.

10 Claims, 12 Drawing Sheets

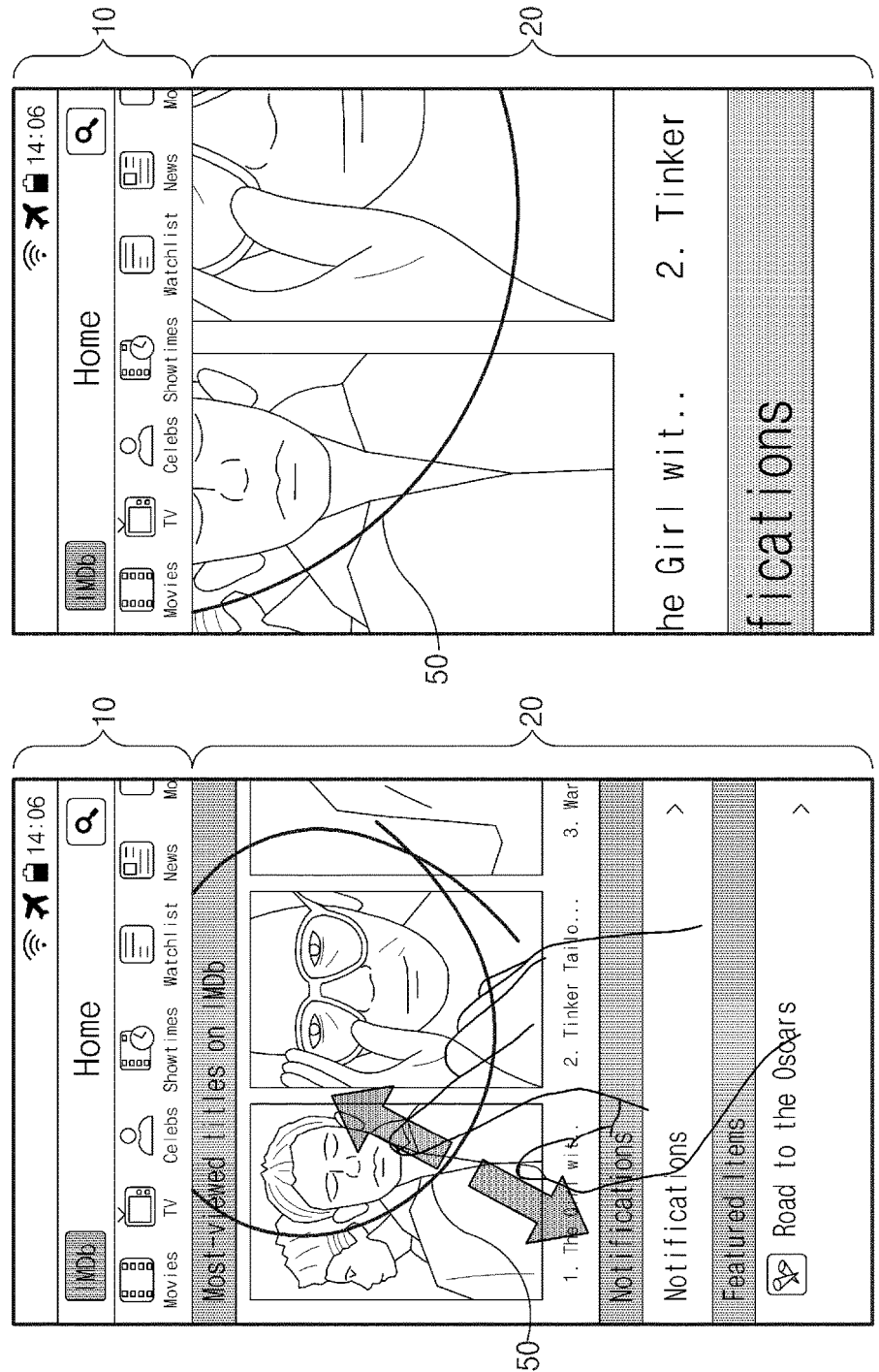

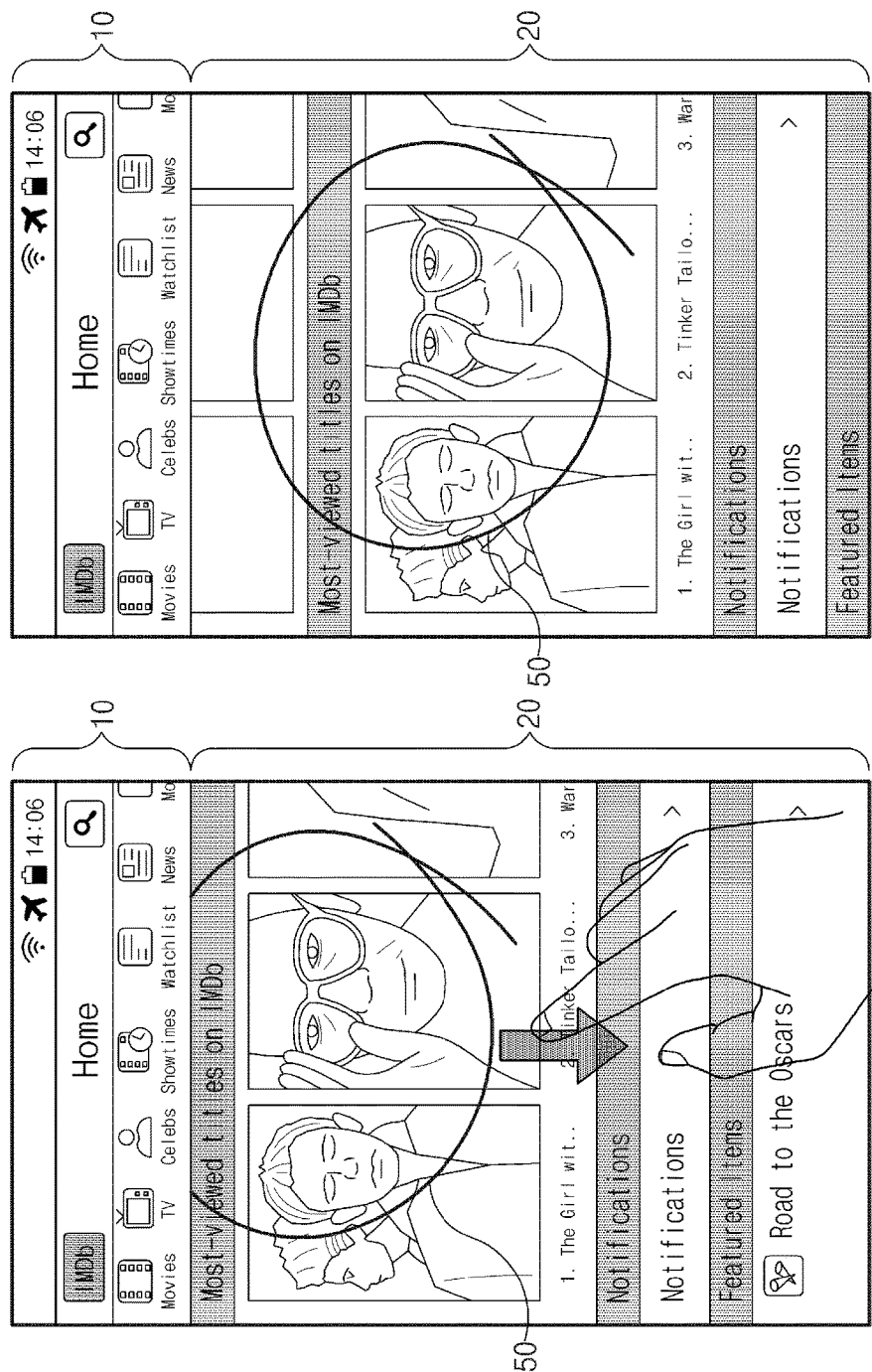

MULTIPLE TRANSPARENT ANNOTATION LAYERS FOR USE WITHIN A GRAPHICAL USER INTERFACE

PRIORITY

This application claims priority under 35 U.S.C. § 119(a) to Korean Patent Application, Serial No. 10-2014-0039759, filed Apr. 3, 2014, in the Korean Intellectual Property Office, the entire disclosure of which is incorporated herein by reference, is claimed.

BACKGROUND

1. Field of the Invention

The present invention relates generally to an electronic device displaying content of an application and written data and a display method thereof.

2. Description of the Related Art

Aided by the development of electronic technology, various types of electronic devices are being developed and supplied. In particular, electronic devices, such as TVs, mobile phones, personal computers (PCs), and notebook PCs, are widely used in most households.

As the use of electronic devices increase, users' requirements for various functions also increase. In order to meet the users' requirements, products equipped with new functions that have not previously existed are being introduced one after another, and electronic devices that provide a writing function have recently been placed on the market.

In particular, a writing function is provided through an input device such as a touch screen, and a user may conveniently input data using the writing function.

The writing function may be serviced through an additional application providing the writing function. When entering a writing mode, an application providing the writing function is executed, and written data may be input on a currently displayed screen.

Since an application currently executed on a displayed screen does not incorporate the written data, when the written data is called again after content provided by the application is enlarged or reduced, in a state where the written data is input and stored, magnifications of the content and the written data may differ from each other.

In addition, in the case where a region on which the content is displayed and a region on which the written data is displayed are different in an application execution screen, when the content is enlarged or reduced, the written data may be displayed in a mismatched manner due to different center points, even though the written data is enlarged or reduced with an identical degree of magnification.

SUMMARY

The present invention has been made to address at least the problems and disadvantages described above, and to provide at least the advantages described below.

Accordingly, an aspect of the present invention is to provide an electronic device capable of maintaining written data combined with content of an application even when the content is enlarged or reduced, and a display method of the electronic device.

In accordance with an aspect of the present invention an electronic device is provided. The electronic device includes an input unit configured to receive written data from a user, and a display unit configured to display an application execution screen of an application on a first layer, display a first written data on a second layer disposed on an upper side of the first layer, and display a second written data on a third layer disposed on an upper side of the second layer, wherein the display unit is further configured to display written data included in a content displaying region of the application execution screen, from among the first written data and the second written data, the content displaying region is a region on which content is displayed on the application execution screen, and the first written data and the second written data is editable based on a user command, and storable independently from the application.

In accordance with another aspect of the present invention, a display method of an electronic device is provided. The method includes displaying an application execution screen on a first layer of a display screen, determining a content displaying region of the application execution screen, wherein the content displaying region is a region of the application execution screen on which content of an application is displayed, displaying, on a second layer of the display screen, written data included in the content displaying region, from among a first written data, the second layer disposed on an upper side of the first layer; and displaying, on a third layer of the display screen, written data included in the content displaying region, from among a second written data, the third layer disposed on an upper side of the second layer, wherein the first written data and the second written data is editable based on a user command, and storable independently from an application.

BRIEF DESCRIPTION OF THE DRAWINGS

The above and other aspects, features, and advantages of the present invention will be more apparent from the following detailed description taken in conjunction with the accompanying drawings, in which:

FIGS. 5A and 5B illustrate a process of enlarging written data on an application execution screen, according to an embodiment of the present invention;

FIGS. 6A and 6B illustrate a process of scrolling written data on an application execution screen, according to an embodiment of the present invention;

DETAILED DESCRIPTION OF EMBODIMENTS OF THE PRESENT INVENTION

Hereinafter, embodiments of the present invention will be described in detail with reference to the accompanying drawings. The present invention may, however, be embodied in many different forms and should not be construed as limited to the embodiments set forth herein. Rather, these embodiments are provided so that the description will be thorough and complete and will fully convey the scope of the invention to those skilled in the art.

Figure 1:
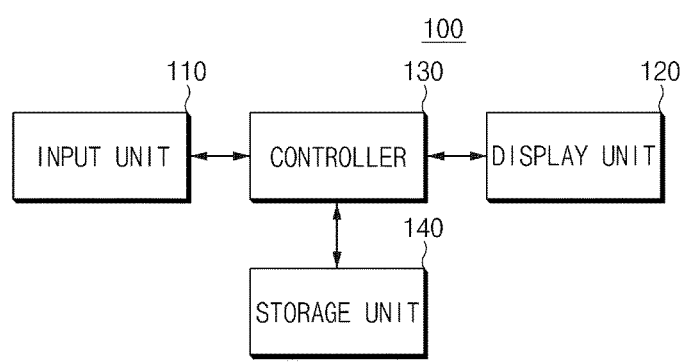
FIG. 1 is a block diagram illustrating a configuration of an electronic device, according to an embodiment of the present invention.

FIG. 1 is a block diagram illustrating a configuration of an electronic device, according to an embodiment of the present invention.

Referring to FIG. 1, electronic device 100 includes an input unit 110, a display unit 120, a controller 130, and a storage unit 140. The electronic device 100 may be implemented in an electronic device including a display, such as a TV, a mobile phone, a smart phone, a notebook PC, a desktop PC, or a tablet PC.

The input unit 110 receives a user command for controlling the electronic device 100. According to an embodiment of the present invention, the input unit 110 receives written data from a user. The written data refers to data, such as characters, lines, figures, or pictures, written and input by the user.

The input unit 110 receives a user command for enlarging or reducing content displayed on the display unit 120.

According to an embodiment of the present invention, the input unit 110 receives a user command for scrolling the content displayed on the display unit 120.

According to an embodiment of the present invention, the input unit 110 receives a user command for adding or removing layers. For example, the user may input a user command for adding a second layer to be displayed in a state where a first layer is displayed.

According to an embodiment of the present invention, the input unit 100 receives a user command for storing written data. The input unit 100 receives a user command for calling written data previously stored in the storage unit 140. For example, the user may select at least one pre-stored written data to be displayed on the display unit 120. The input unit 110 receives a user command for changing the written data displayed on the display unit 120 into another pre-stored written data. The input unit 110 receives a user command for editing written data pre-stored in the storage unit 140. For example, the user may delete a part of written data or may input new written data in a state where the written data is displayed.

The input unit 110 includes at least one of a touch screen or touch pad operated by a user's touch input, keys, a mouse, and a motion recognition sensor recognizing a user's motion.

The input unit 110 may be implemented in various ways based on the type of characteristics of the electronic device 100. For example, when the electronic device 100 is implemented with a smart phone, the input unit 110 may be implemented with a touch screen. When the electronic device 100 is implemented with a TV, the input unit 110 may be implemented with a remote controller or a motion recognition sensor including a touch pad.

The display unit 120 displays data.

According to an embodiment of the present invention, the display unit 120 displays an application execution screen. The display unit 120 displays written data input through the input unit 110.

According to an embodiment of the present invention, the input unit 110 and the display unit 120 may be implemented with one device enabling a touch input like a touch screen and a display screen output.

According to an embodiment of the present invention, the display unit 120 includes a plurality of virtual layers. For example, the display unit 120 includes first and second layers. The display unit 120 displays an application execution screen or a background screen (or an idle screen) on the first layer. The display unit 120 displays written data on the second layer. The second layer may be disposed on an upper side of the first layer. Hereinafter, the plurality of layers of the display unit 120 is described in detail with reference to FIGS. 2A and 2B.

Figure 2A:
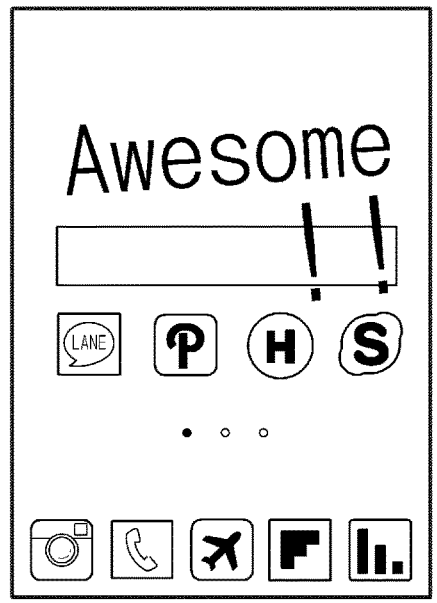
FIGS. 2A and 2B illustrate a display of an electronic device, according to an embodiment of the present invention.
Figure 2B:
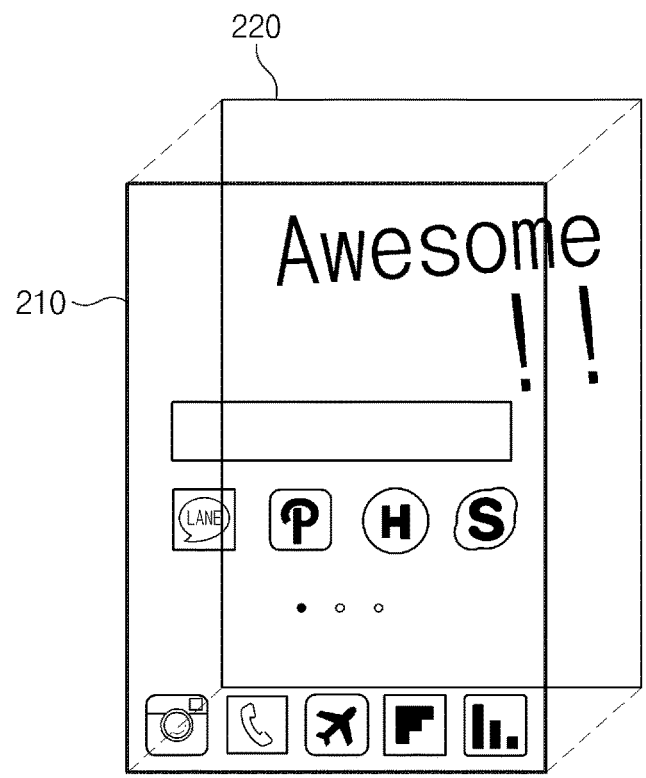

FIGS. 2A and 2B illustrate a display of an electronic device, according to an embodiment of the present invention.

Referring to FIG. 2A, a background screen is displayed on a display screen, and written data "Awesome" is displayed on the background screen. The display unit 120 displays the display screen, as shown in FIG. 2A, using two virtual layers.

Referring to FIG. 2B, the display unit 120 includes a first layer 120 and a second layer 220. The first layer 210 displays the background screen, and the second layer 220 displays written data. The second layer 220 may be disposed on an upper side of the first layer 210. The display unit 120 may also include a third layer 230 for displaying written data.

According to an embodiment of the present invention, the layer on which the written data is displayed is a transparent layer. Accordingly, the display unit 120 displays the data displayed on the first layer 210 and the written data displayed on the second layer 220 (and third layer 230) together. For example, an application execution screen is displayed on the first layer 210, and the second layer 220 and third layer 230 displays the written data. A layer on which the written data is displayed may be individually added or removed based on a user command. When written data is displayed on a plurality of layers, written data displayed on each of the plurality of layers may be individually enlarged, reduced, scrolled, or edited.

According to an embodiment of the present invention, an application execution screen displayed on the first layer 210 is divided into a region on which fixed data is displayed and a region on which variable data is displayed. For example, in the fixed data displaying region, information or menus related to applications may be displayed. In the variable data displaying region, content provided by applications may be displayed. Data displayed on the variable data region may be enlarged, reduced, scrolled, or edited according to a user command.

FIGS. 3A to 3D illustrate application execution screens, according to an embodiment of the present invention.

Referring to FIGS. 3A to 3D, each of the application execution screens include a fixed data displaying region 10, on which information on an application (e.g., an application name) or a menu provided by the application is displayed, and a variable data displaying region 20 (also referred to as the content displaying region), on which content provided by the application is displayed. The user may enlarge, reduce, or scroll the content displaying region 20.

Figure 3A:
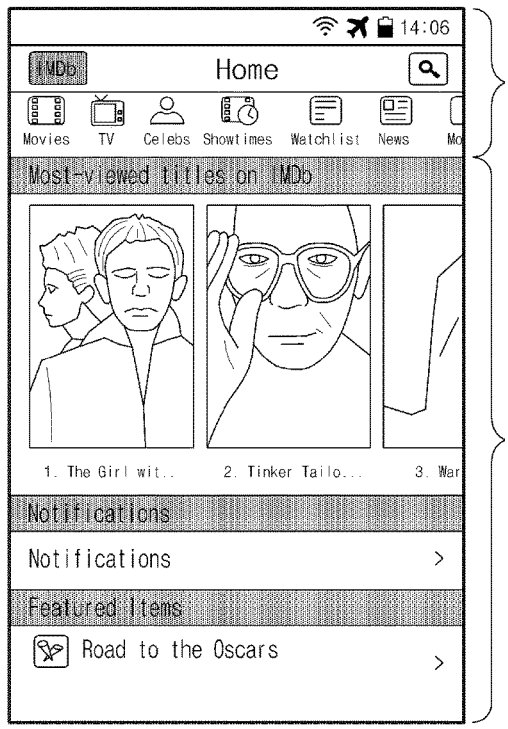
FIGS. 3A to 3D illustrate application execution screens, according to an embodiment of the present invention.
Figure 3B:
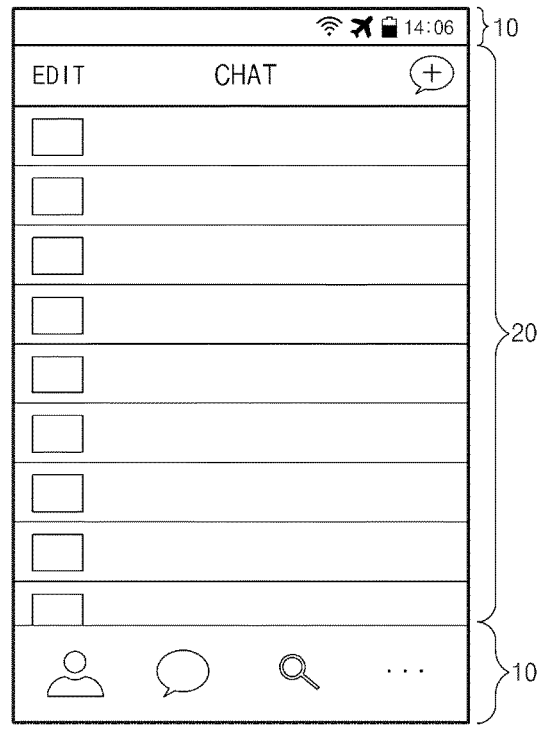
Figure 3C:
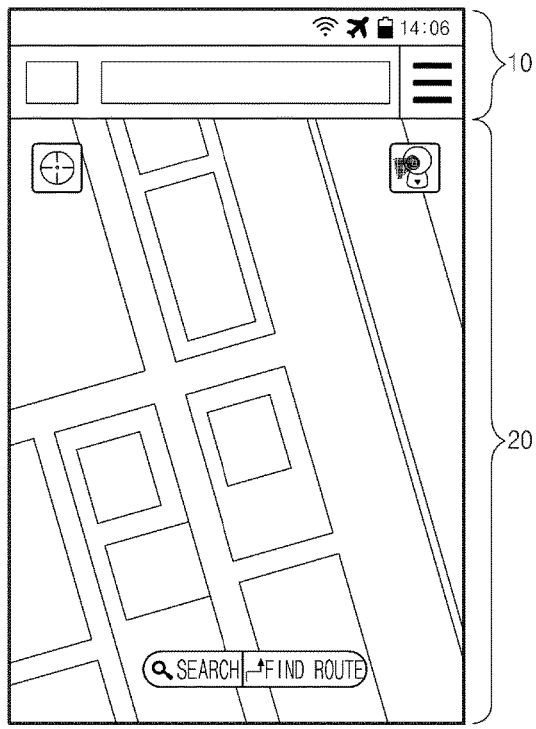
Figure 3D:
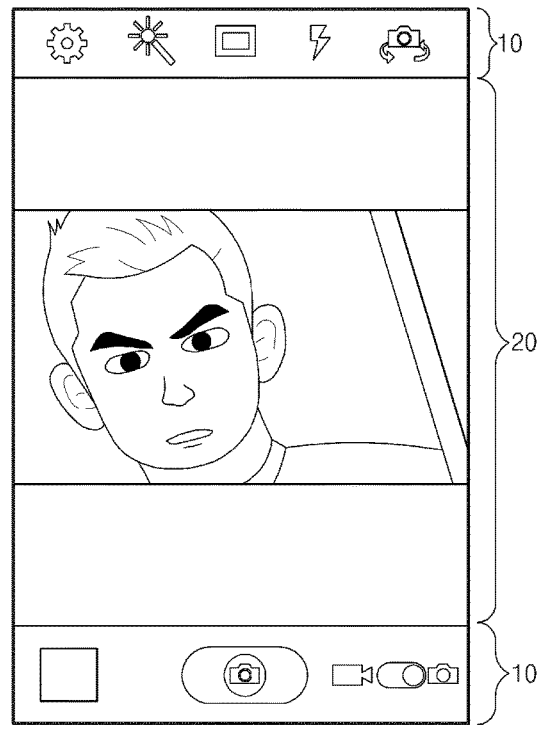

Based on the application being executed, content displayed on a display screen may differ based on the type of application or menu provided by the application. For example, as illustrated in FIG. 3A, when an application providing information on movie or broadcast content is executed, content such as a movie poster, movie ranking, movie review, and broadcast schedule may be displayed. For another example, as illustrated in FIG. 3B, when an instant message application is executed, content such as a chat room list and dialogue content may be provided. For another example, as illustrated in FIG. 3C, when a map application is executed, a route to the destination may be displayed. For another example, as illustrated in FIG. 3D, when a camera application is executed, an image captured through a camera module may be displayed.

The display 120 displays written data included in the content displaying region 20 from written data input to the input unit 110. Since a region on which content is displayed may differ based on the type of application being executed, the region on which the written data is displayed may be changed based on the type of application displayed on the first layer 210.

Figures 4A, 4B:
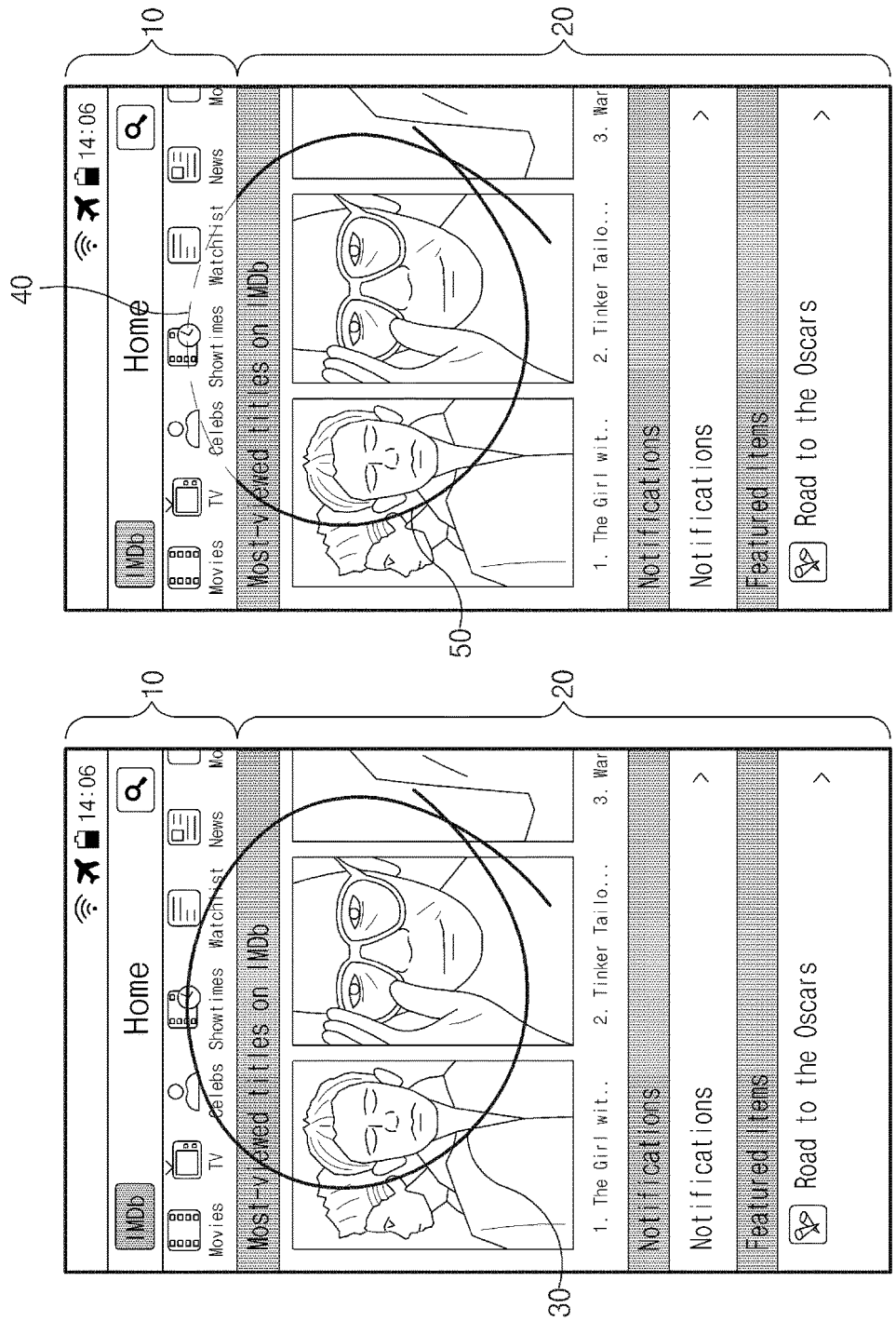
FIGS. 4A and 4B illustrate written data on an application execution screen, according to an embodiment of the present invention.

FIGS. 4A and 4B illustrate written data on an application execution screen, according to an embodiment of the present invention.

Referring to FIGS. 4A and 4B, as described above, the application execution screen is divided into the fixed data displaying region 10, on which information on the application or a menu provided by the application is displayed, and the content displaying region 20, on which content provided by the application is displayed.

When the application execution screen is displayed, the controller 130 determines the content displaying region 20 on which the content is displayed among the application execution screen.

In a state where the application execution screen is displayed, the user may input written data. For example, as illustrated in FIG. 4A, the user may input written data 30 of a circle. As shown in FIG. 4A, the written data 30 may be input to the fixed data displaying region 10, on which the menu provided by the application, as well as to the content displaying region 20, on which the content is displayed.

As shown in FIG. 4B, the display unit 120 may, alternatively, not display the portion of the written data 30, i.e., written data 40, which is input to the fixed data displaying region 10, and may only display the portion of written data 30, i.e., written data 50, which is included in the content displaying region 20.

When the content included in the application execution screen is enlarged or reduced, the display unit 120 enlarges or reduces the written data based on the degree of magnification of the enlarged or reduced content, and displays the enlarged or reduced written data in the region on which the content is displayed.

FIGS. 5A and 5B illustrate a process of enlarging written data on an application execution screen, according to an embodiment of the present invention.

Referring to FIGS. 5A and 5B, as described above, the application execution screen is divided into the fixed data displaying region 10, on which information on the application or a menu provided by the application is displayed, and the content displaying region 20, on which content provided by the application is displayed.

As shown in FIG. 5A, the display unit 120 displays written data 50, i.e., the portion of input written data 30 which is included in the content displaying region 20.

When a user command is input for enlarging content in a state where the content and written data are displayed, the content is enlarged and displayed, as shown in FIG. 5B. When the content is enlarged, the controller 130 compares the magnification of the content with the magnification of the written data. When the magnification of the content and the written data do not match, the display unit 120 adjusts the magnification of the content and written data to match and displays the content and the written data with matching magnification.

When the content included in the application execution screen is scrolled, the display unit 120 moves the written data together with the scrolled content and displays the written data and the content in the content displaying region 20.

FIGS. 6A and 6B illustrate a process of scrolling written data on an application execution screen, according to an embodiment of the present invention.

Referring to FIGS. 6A and 6B, as described above, the application execution screen is divided into the fixed data displaying region 10, on which information on the application or a menu provided by the application is displayed, and the content displaying region 20, on which content provided by the application is displayed.

As shown in FIG. 6A, the display unit 120 displays written data 50, i.e., the portion of written data 30 which is included in the content displaying region 20.

When a user command is input for scrolling content in a state where the content and written data are displayed, the content is scrolled and displayed, as shown in FIG. 6B. When the content is scrolled and displayed, the controller 130 checks a direction and amount of the scrolled content. For example, the controller 130 compares pixel coordinates before and after the scroll and checks the direction and amount of the scrolled content. The display unit 120 moves the written data together with to the scrolled content and displays the written data and the content in the content displaying region 20.

When an application is executed, the display unit 120 displays an object notifying that there is written data combined with the executed application. The display unit 120 displays the written data combined with the executed application according to a user command. When displaying the written data, the display unit 120 adjusts the magnification of the content, provided by the application, to be the same as the magnification of the written data and displays the magnified content and written data.

The display unit 120 may change the display of one written data combined with the content of the executed application, to display another written data combined with the executed application (or function provided by the application).

Figure 7A:
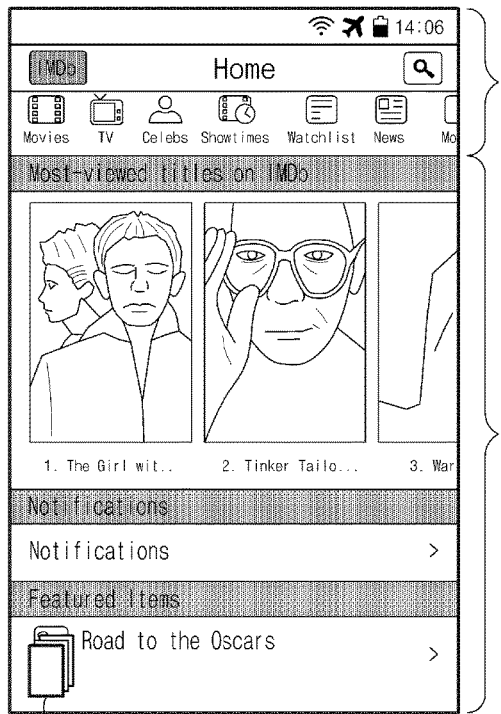
FIGS. 7A to 7C illustrate a process of displaying, on an application execution screen, stored written data combined with content of an executed application, according to an embodiment of the present invention.
Figure 7B:
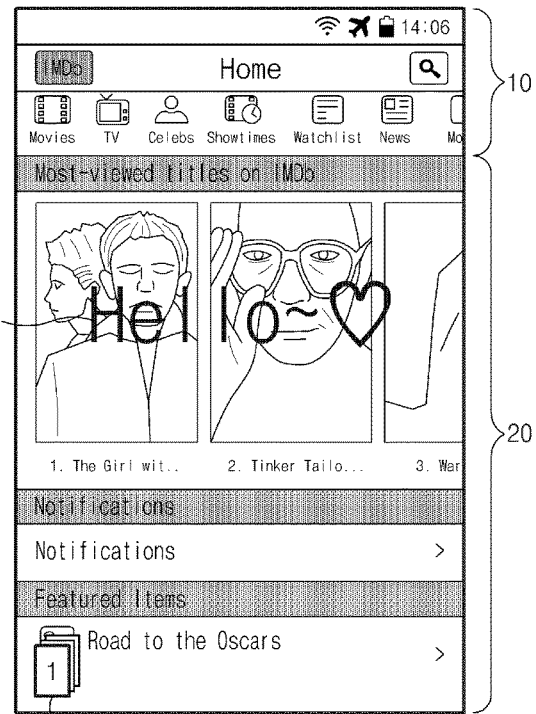
Figure 7C:
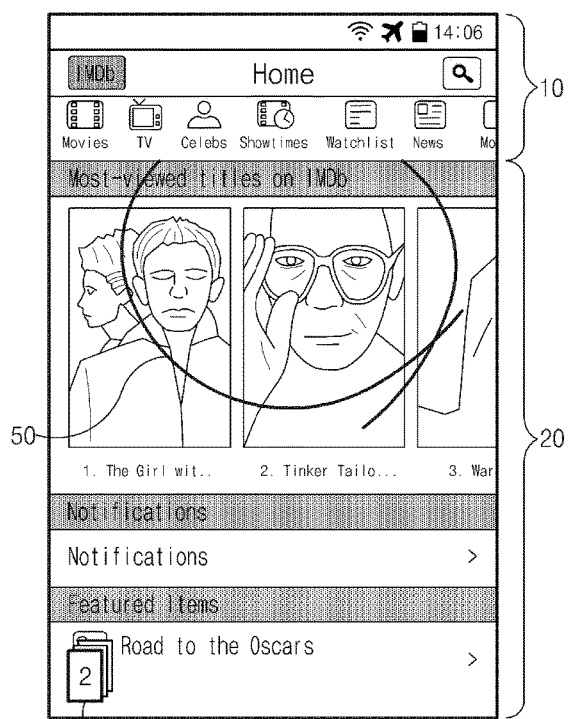

FIGS. 7A to 7C illustrate a process of displaying, on an application execution screen, stored written data combined with content of an executed application, according to an embodiment of the present invention.

Referring to FIGS. 7A to 7C, when an application is executed, the controller 130 checks whether there is stored written data combined with the content of the executed application. When there is stored written data combined with the content of the executed application, the display unit 120 displays an object 60 notifying that there is written data combined with the content of the executed application.

The object 60 is displayed to represent the number of written data which is combined with the content of the executed application. For example, when the number of layers included in the executed application screen is three, an object 60 is displayed, indicating that three layers are combined, as shown in FIG. 7A.

When a user command is input for selecting the object 60, one of the written data combined with the content of the executed application, i.e., written data 55, is displayed, as shown in FIG. 7B. When the written data combined with the content of the executed application is displayed, the controller 130 compares the magnification of the content and the stored written data. When the magnification of the content and stored written data do not match, the display unit 120 adjusts the magnification of the content and stored written data to match and displays the magnified content and stored written data.

When the written data combined with the content of the executed application is displayed, numerals or symbols representing an order of the currently displayed written data is displayed on the object 60, as shown in FIGS. 7B and 7C.

As shown in FIG. 7B, when a user command is input again for selecting the object 60 in a state where one of the written data combined with the content of the executed application, i.e., written data 55, is displayed, another written data, i.e. written data 50, combined with the content of the executed application is displayed, as shown in FIG. 7C. Accordingly, each a user command is input for selecting the object 60, the written data combined with the content of the executed application is sequentially changed and displayed.

Figure 8A:
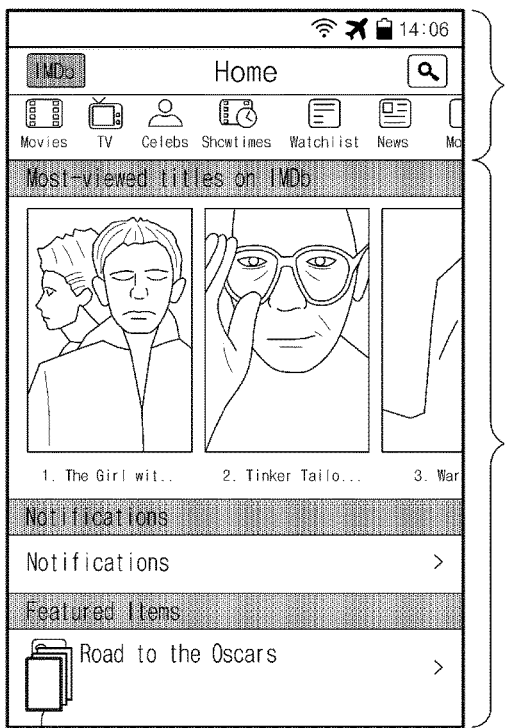
FIGS. 8A to 8C illustrate a process of displaying, on an application execution screen, stored written data combined with content of an executed application, according to another embodiment of the present invention.
Figure 8B:
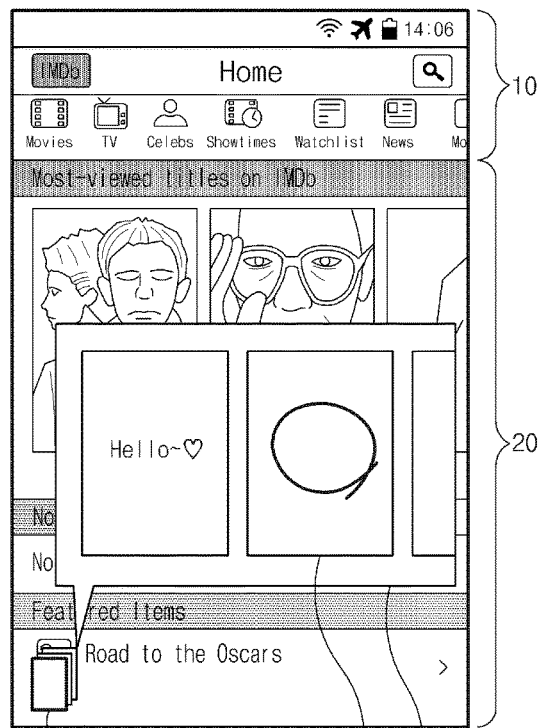
Figure 8C:
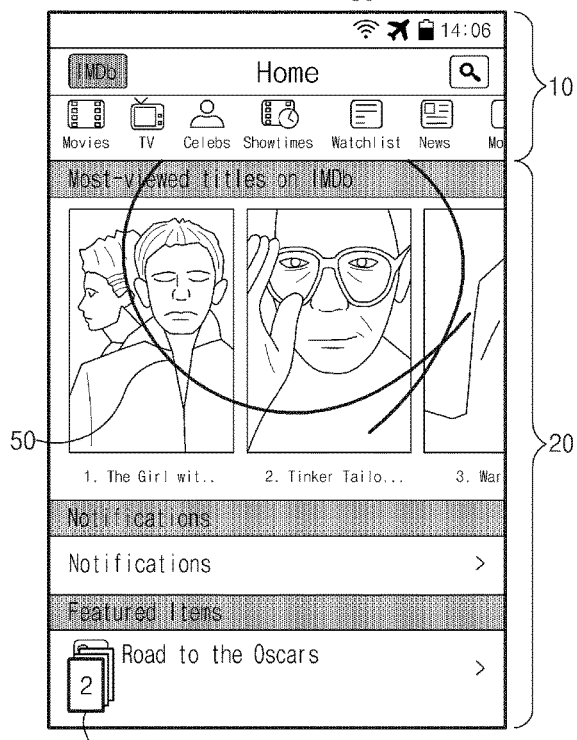

FIGS. 8A to 8C illustrate a process of displaying, on an application execution screen, stored written data combined with content of an executed application, according to another embodiment of the present invention.

Referring to FIGS. 8A to 8C, the controller 130 checks whether there is stored written data combined with the content of the executed application. When there is stored written data combined with the content of the executed application, the display unit 120 displays an object 60 notifying that there is the written data combined with the content of the executed application.

The object 60 is displayed to represent the number of layers included in the executed application screen and the number of written data which is combined with the content of the executed application. For example, when the number of layers included in the executed application screen is three, an object 60 is displayed, indicating that three layers are combined, as shown in FIG. 8A.

When a user command for selecting the object 60 is selected, a list 70 representing the written data combined with the content of the executed application is displayed. The written data on the list 70 may be displayed in a reduced size, as shown in FIG. 8B.

When a user command is input for selecting one of written data displayed on the list 70, i.e. written data 75, the written data 50 is displayed, as shown in FIG. 8C.

In this case, the display unit 120 displays the execution screen of the application on the first layer (including the content of the executed application), and the selected written data on the second layer.

Figure 9B:
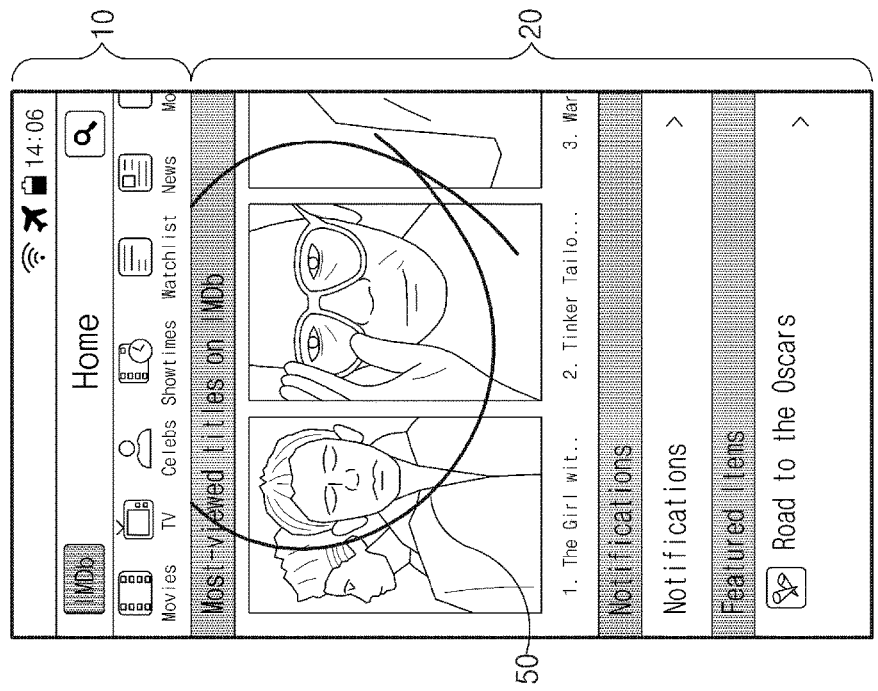
FIGS. 9A and 9B illustrate a process of displaying pre-stored written data, according to an embodiment of the present invention.
Figure 9A:
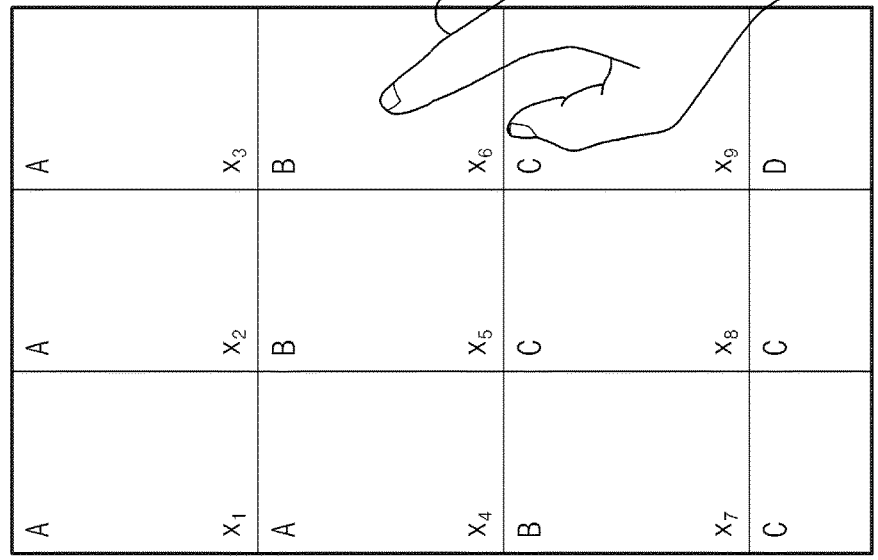

FIGS. 9A and 9B illustrate a process of displaying pre-stored written data, according to an embodiment of the present invention.

Referring to FIG. 9A, written data pre-stored in the storage unit 140 are arranged and displayed. The pre-stored written data (e.g., $x_1, x_2, \ldots, x_9$) may be arranged and displayed according to types of applications (e.g., A, B, C and D) with which the written data can be combined.

When a user command is input for selecting one of the pre-stored written data (e.g., $x_6$), the controller 130 executes an application (e.g., B) with which the selected written data can be combined. In addition, the display unit 120 displays an application execution screen (e.g., application execution screen of B) on the first layer, as shown in FIG. 9B, and the selected written data 50 (e.g., $x_6$) on the second layer.

When a plurality of applications are executed, the display unit 120 displays information on written data combined with contents of each of the plurality of applications. For example, the display unit 120 displays the number of written data combined with contents each of the plurality of applications.

Figure 10:
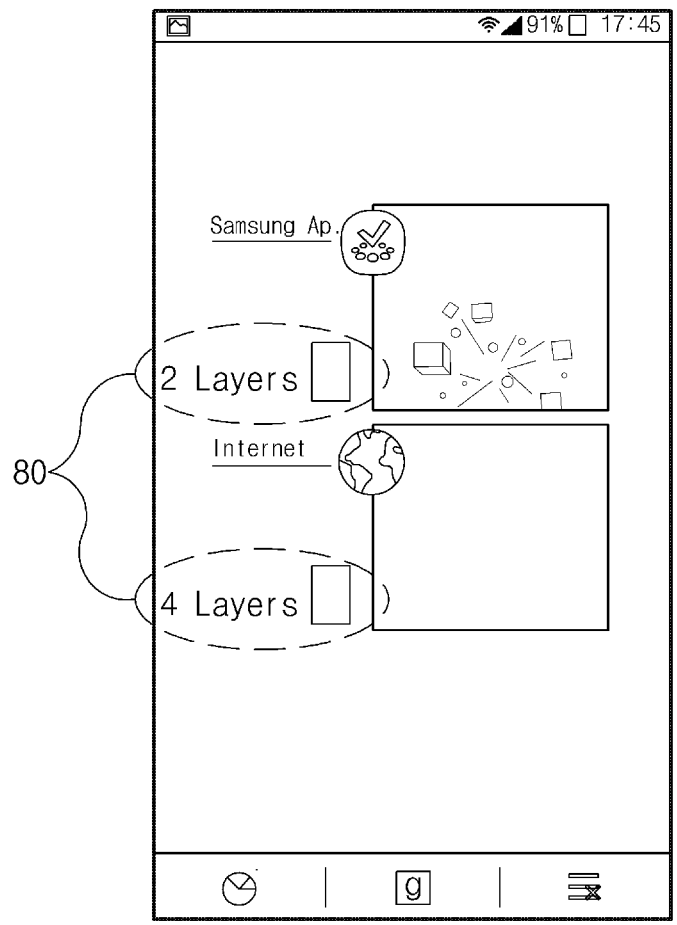
FIG. 10 illustrates a view of a multi-tasking screen displaying information on written data, according to an embodiment of the present invention.

FIG. 10 illustrates a view of a multi-tasking screen displaying information on written data, according to an embodiment of the present invention.

Referring to FIG. 10, the display unit 120 displays names and execution screens of currently executed applications on the multi-tasking screen. In addition, the display unit 120 displays information 80 on the written data combined with the content of each application. As shown in FIG. 10, the information on the written data may include an object representing the written data and the number of the written data.

When a user command is input for selecting information 80 on the written data displayed on the multi-tasking screen, the display unit 120 displays an execution screen of the corresponding application and the written data together.

Referring back to FIG. 1, the controller 130 controls overall operations of the electronic device 100. When an application is executed, the controller 130 determines a region on which content is displayed among an execution screen of the application. For example, the controller 130 determines the region on which the content is displayed by using information such as corner coordinates, width, height of the region on which the content is displayed.

When the content is enlarged or reduced, the controller 130 checks magnification of the enlarged or reduced content. When the content is scrolled, the controller 130 checks a direction and amount of the scrolled content. For example, the controller 130 compares pixel coordinates before and after the scroll and checks the direction and amount of the scrolled content.

When the stored written data is displayed, the controller 130 compares magnifications of the content provided by the application and of the written data.

When a user command is input for executing an application, the controller 130 executes the application. When the application is executed, the controller 130 checks whether there is written data combined with the content of the executed application.

When a user command is input for selecting one of the pre-stored written data, the controller 130 executes an application with which the selected written data can be combined. For example, when one of the pre-stored written data is selected, the controller 130 checks whether the selected written data can be combined with a specific application. When the selected written data can be combined with the specific application, the controller 130 executes the corresponding application.

When the plurality of applications is being executed, the controller 130 checks whether there is written data combined with each of the plurality of applications.

The storage unit 140 stores an operating system necessary for driving the electronic device 100, various applications, and contents of the applications. The storage unit 140 stores written data input to the input unit 110.

The storage unit 140 stores the written data classified for each type of application or for each function provided by the applications. For example, when written data is input, the storage unit 140 stores the written data combined with an executed application. A plurality of written data may be stored for each type of application or each function provided by the applications.

The storage unit 140 stores the written data independently from the applications. For example, written data input in a state where a first application is being executed may be displayed in a state where a second application is being executed as well as the first application is being executed.

The storing unit 140 stores the written data together with magnification information. The magnification of the written data is magnification of the content displayed when the written data is first input.

The electronic device 100, according to an embodiment, includes an input unit 110 for receiving written data from the user and a display unit 120 for displaying an application execution screen on a first layer 210, displaying first written data on the second layer 220, disposed on the upper side of the first layer, and displaying second written data on a third layer 230, disposed on the upper side of the second layer 220. The display unit 120 displays the written data included in the content displaying region. The first or second written data is editable according to a user command, and storable independently from the application.

Figure 11:
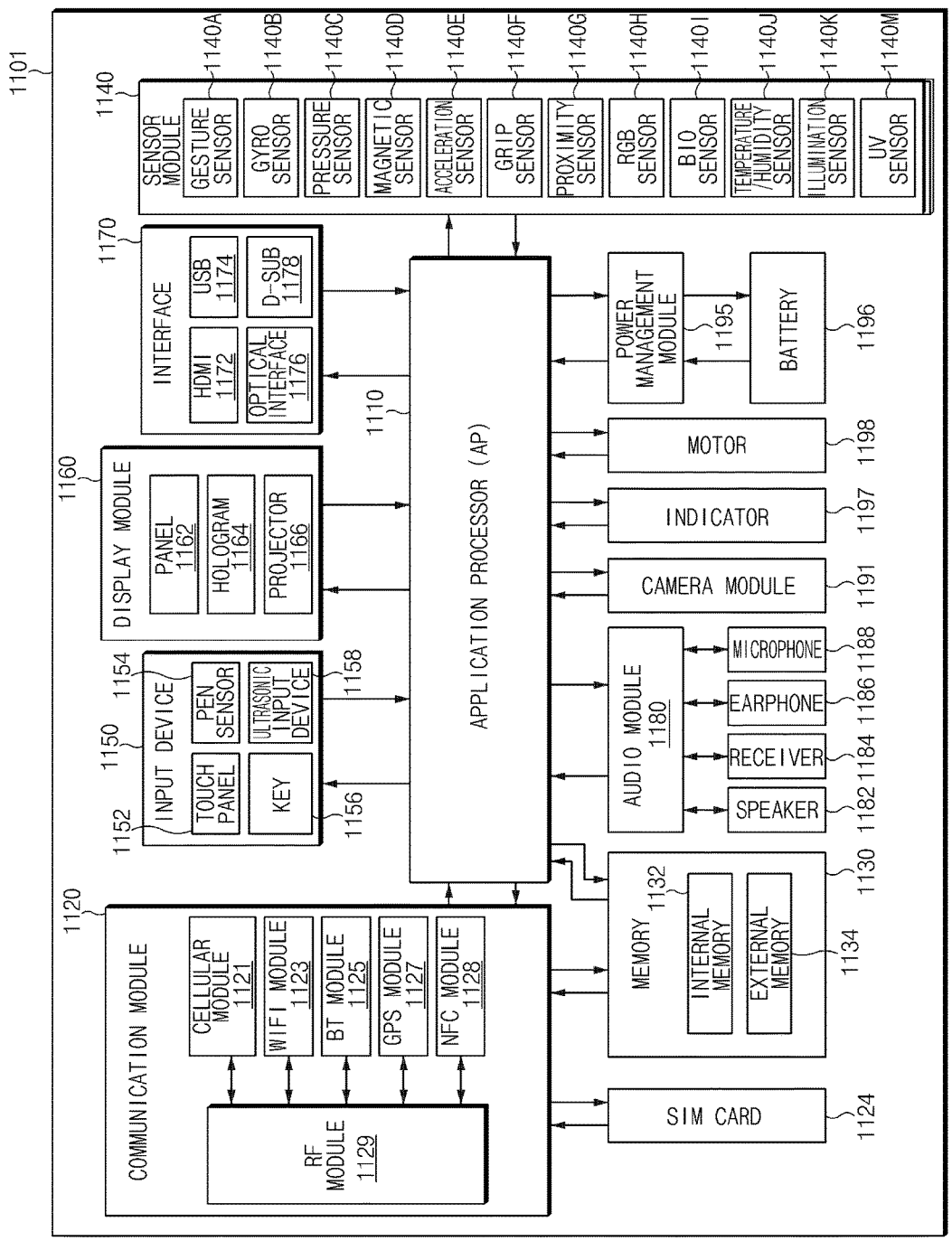
FIG. 11 is a block diagram of an electronic device, according to an embodiment of the present invention.

FIG. 11 is a block diagram of an electronic device, according to an embodiment of the present invention.

Referring to FIG. 11, the electronic device 1101 may be configured as the entirety of or a part of the electronic device 100, illustrated in FIG. 1.

The electronic device 1101 includes at least one of an Application Processor (AP) 1110, a communication module 1120, a Subscriber Identification Module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 (e.g., the controller 130, shown in FIG. 1), drives an operating system or an application program and controls a plurality of hardware or software elements connected thereto, and performs various data processing and operations, including processing of multimedia data. The AP 1110 may be implemented with, for example, System on Chip (SoC). The AP 1110 may further include a graphic processing unit (GPU).

The communication module 1120 performs data transmission and reception in communications between the electronic device 1101 (e.g., the electronic device 100, shown in FIG. 1) and other electronic devices connected through a network. The communication module 1120 includes a cellular module 1121, a Wi-Fi module 1123, a BT module 1125, a GPS module 1127, an NFC module 1128, and a Radio Frequency (RF) module 1129.

The cellular module 1121 provides a voice call, a video call, a text messaging service, or an internet service, etc., through a communication network (e.g., Long Term Evolution (LTE), Long Term Evolution Advanced (LTE-A), Code Division Multiple Access (CDMA), Wideband Division Multiple Access (WCDMA), Universal Mobile Telecommunications System (UMTS), Wireless Broadband (WiBro), Global System for Mobile (GSM) communication, etc.). In addition, the cellular module 1121 may identify or authenticate an electronic device in a communication network by using, for example, a subscriber identification module (e.g., the SIM card 1124). The cellular module 1121 may perform at least a part of functions provided by the AP 1110. For example, the cellular module 1121 may perform at least a part of multimedia control function.

The cellular module 1121 may include a Communication Processor (CP). In addition, the cellular module 1121 may be implemented with a SoC. Although, in FIG. 11, the elements, such as the cellular module 1121 (e.g., CP), the memory 1130, and the power management module 1195, are illustrated as separate from the AP 1110, according to an embodiment of the present invention, the AP 1110 may be implemented to include at least some (e.g., the cellular module 1121) of the above-described elements.

The AP 1110 or the cellular module 1121 (e.g., CP) may load, on a volatile memory, commands or data received from at least one of a nonvolatile memory and other elements and process them. Furthermore, the AP 1110 or the cellular module 1121 may store, in the nonvolatile memory, data received from or created by at least one of other elements.

Each of the Wi-Fi module 1123, the BT module 1125, the GPS module 1127, and the NFC module 1128 may include a processor for processing data transmitted or received through the corresponding module. Although, in FIG. 11, the cellular module 1121, the Wi-Fi module 1123, the BT module 1125, the GPS module 1127, and the NFC module 1128 are each illustrated as separate blocks, at least some (e.g., at least two) of these components may be included in a single Integrated Chip (IC) or an IC package. For example, at least some (e.g., a CP corresponding to the cellular module 1121 and a Wi-Fi processor corresponding to the Wi-Fi module) of processors, respectively corresponding to the cellular module 1121, the Wi-Fi module 1123, the BT module 1125, the GPS module 1127, and the NFC module 1128 may be implemented as one SoC.

The RF module 1129 transmits and receives data, for example, an RF signal. Although not shown in the drawing, the RF module 1129 may includes a transceiver, a Power Amp Module (PAM), a frequency filter, or a Low Noise Amplifier (LNA), etc. In addition, the RF module 1129 may further include components, such as, a conductor or a wire for transmitting and receiving an electromagnetic wave in a free space in a wireless communication. In FIG. 11, although the cellular module 1121, the Wi-Fi module 1123, the BT module 1125, the GPS module 1127, and the NFC module 1128 are illustrated as sharing one RF module 1129, according to an embodiment of the present invention, at least one of the cellular module 1121, the Wi-Fi module 1123, the BT module 1125, the GPS module 1127, and the NFC module 1128 may transmit and receive an RF signal through a separate RF module.

The SIM card 1124 is a card including a subscriber identification module and is inserted into a slot formed at a specific position of the electronic device 1101. The SIM card 1124 includes unique identification information (e.g., Integrated Circuit Card Identifier (ICCID)) or subscriber information (e.g., International Mobile Subscriber Identity (IMSI)).

The memory 1130 (e.g., the memory 140, as shown in FIG. 1) includes an internal memory 1132 or an external memory 1134.

The internal memory 1132 may include at least one of a volatile memory (e.g., a Dynamic RAM (DRAM), Static RAM (SRAM), Synchronous Dynamic RAM (SDRAM) etc.) or a nonvolatile memory (e.g., a One Time Programmable ROM (OTROM), Programmable ROM (PROM), Erasable and Programmable ROM (EPROM), Electrically Erasable and Programmable ROM (EEPROM), mask ROM, flash ROM, NAND flash memory, NOR flash memory etc.). The internal memory 1132 may be a Solid State Drive (SSD).

The external memory 1134 may include a flash drive, for example, Compact Flash (CF), Secure Digital (SD), micro-Secure Digital (micro-SD), mini-Secure Digital (mini-SD), extreme Digital (xD), or a memory stick. The external memory 1134 may be functionally connected to the electronic device 1101 through various interfaces. According to an embodiment of the present invention, the electronic device 1101 may further include a storage device (or storage medium), such as a hard drive.

The sensor module 1140 measures a physical quantity or detects an operating state of the electronic device 1101, and converts the measured or detected information into an electrical signal. The sensor module 1140 includes at least one of a gesture sensor 1140A, a gyro sensor 1140B, an atmospheric pressure sensor 1140C, a magnetic sensor, 1140D, an acceleration sensor 1140E, a grip sensor 1140F, a proximity sensor 1140G, a color sensor 1140H (e.g., Red, Green, Blue (RGB) sensor), a biometric sensor 1140I, a temperature/humidity sensor 1140J, an ambient light sensor 1140K, and a UV (ultra violet) sensor 1140M. Additionally, or alternatively, the sensor module 1140 may include an e-nose sensor, an electromyography (EMG) sensor, an electroencephalogram (EEG) sensor, an electrocardiogram (ECG) sensor, an Infra-Red (IR) sensor, an iris sensor, or a fingerprint sensor, etc. The sensor module 1140 may further include a control circuit for controlling at least one sensor included in the sensor module 1140.

The input device 1150 (e.g., the input unit 110, as shown in FIG. 1) includes a touch panel 1152, a (digital) pen sensor 1154, a key 1156, or an ultrasonic input device 1158.

The touch panel 1152 recognizes a touch input in the form of at least capacitive, pressure-sensitive, infra-red ray, and surface acoustic wave type. In addition, the touch panel 1152 may further include a control circuit. In the case of capacitive form of touch input, physical contact or proximity recognition is possible. The touch panel 1152 may further include a tactile layer. In this case, the touch panel 1152 provides a tactile reaction to the user.

The (digital) pen sensor 1154 may be implemented by using a method identical or similar to receiving a user's touch input on a separate recognition sheet.

The key 1156 may include physical buttons, optical keys, or a keypad.

The ultrasonic input device 1158 is a device capable of detecting a sound wave through a microphone (e.g., the microphone 1188). The ultrasonic input device 1158 checks data in the electronic device 1101 through an input tool generating an ultrasonic wave signal, and may operate wirelessly. According to an embodiment of the present invention, the electronic device 1101 may receive a user input from an external device (e.g., a computer or server) by using the communication module 1120.

The display 1160 (e.g., the display unit 120, as shown in FIG. 1) includes a panel 1162, a hologram device 1164, and a projector 1166. The panel 1162 may be a liquid crystal display or an active-matrix organic light-emitting diode (AMOLED). The panel 1162 may be implemented as a flexible, transparent or wearable panel. The panel 1162 may be configured as one module with the touch panel 1152.

The hologram device 1164 shows a stereoscopic image in the air by using interference of light.

The projector 1166 displays an image by projecting a light on a screen. The screen may be located inside or outside the electronic device 1101. According to an embodiment of the present invention, the display 1160 may further include a control circuit for controlling the panel 1162, the hologram device 1164, or the projector 1166.

The interface 1170 includes a High-Definition Multimedia Interface (HDMI), 1172, a Universal Serial Bus (USB) 1174, an optical interface 1176 or a D-subminiature (D-sub) 1178. Additionally, or alternatively, the interface 1170 may include a Mobile High-definition Link (MHL) interface, a Secure Digital (SD) card/multimedia card (MMC) interface, or an Infrared Data Association (IrDA) specification interface.

The audio module 1180 converts sound into an electrical signal, or vice versa. The audio module 1180 may process sound information input from or output to a speaker 1182, a receiver 1184, an earphone 1186, or a microphone 1188.

The camera module 1191 is a device for capturing a still image or a video, and, includes at least one of an image sensor (e.g., a front side sensor or a rear side sensor), a lens, an Image Signal Processor (ISP), or a flash (e.g., an LED or xenon lamp).

The power management module 1195 manages power of the electronic device 1101. The power management module 1195 may include a Power Management Integrated Circuit (PMIC), a charger integrated circuit, a battery gauge, or a fuel gauge.

The PMIC may be embedded, for example, in an IC or inside a SoC. A charging scheme is divided into a wireless and wired scheme. The charging IC charges the battery and blocks inflow of over-voltage or over-current from a charger. According to an embodiment of the present invention, the charging IC may include a charging IC for at least one of a wired charging scheme or a wireless charging scheme. The wireless charging scheme may include a magnetic resonance scheme, an inductive coupling scheme, or a microwave scheme. An additional circuit, for example, a coil loop, resonance circuit, or rectifier etc, may be further included for wireless charging.

The battery gauge measures, remaining amount of the battery 1196, voltage, current or temperature while in charging mode.

The battery 1196 stores or generates electricity and supplies power to the electronic device 1101 using the stored or generated electricity. The battery 1196 may include a rechargeable battery or solar battery.

The indicator 1197 displays a specific state of the electronic device 1101 or a portion thereof (e.g., the AP 1110), for example, a booting state, a messaging state, or a charging state The motor 1198 converts an electrical signal into a mechanical vibration. The electronic device 1101 may include a processing device (e.g., a GPU) for supporting a mobile TV. The processing device for supporting the mobile TV may process media data complying with specifications such as Digital Multimedia Broadcasting (DMB), Digital Video Broadcasting (DVB), or media flow, etc.

Each of the above-described elements according to various embodiments may be configured with one or more components, and a name of a corresponding element may vary according to a kind of electronic device. An electronic device according to various embodiments may be configured with at least one element from among the above-described elements and some elements may be omitted or additional other elements may be further included. Furthermore, some of elements of an electronic device, according to various embodiments of the present invention, may be combined to be one entity and may perform the same functions as those of corresponding elements before the combination.

Figure 12:
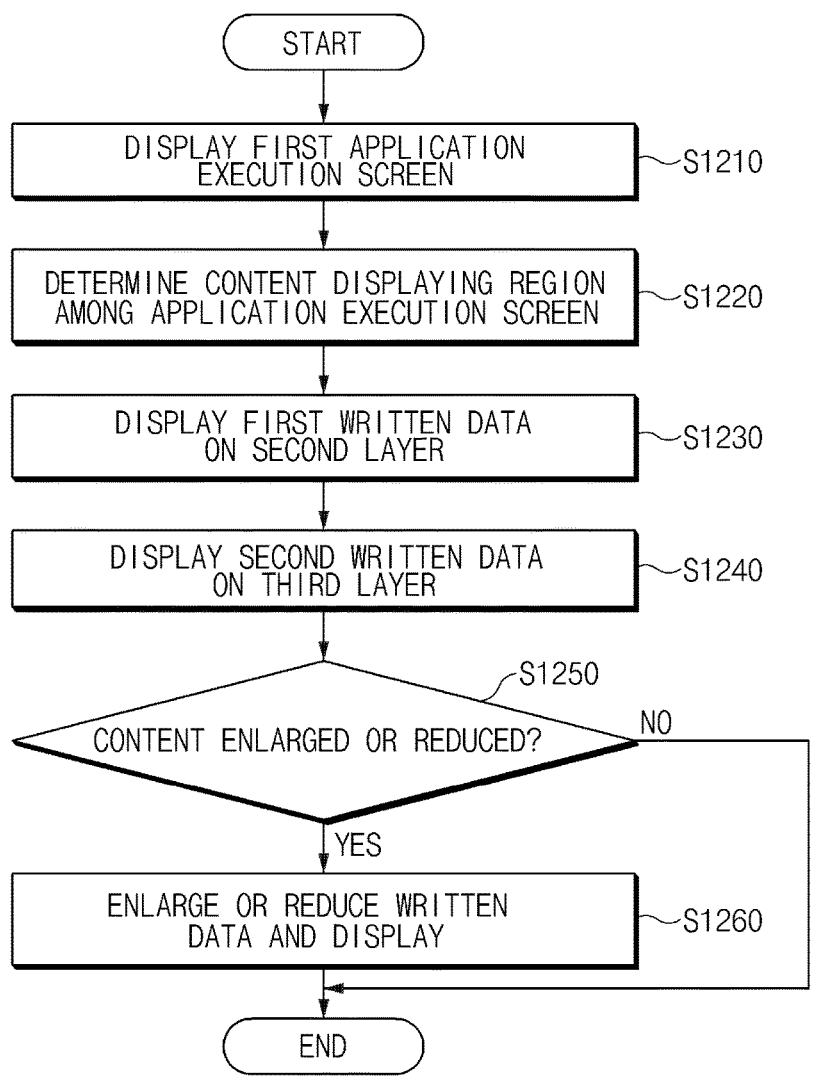
FIG. 12 is a flowchart of a display method of an electronic device, according to an embodiment of the present invention.

FIG. 12 is a flowchart of a display method of an electronic device, according to an embodiment of the present invention.

Referring to FIG. 12, at step S1210, the electronic device 100 displays an application execution screen on the first layer 210 of the display screen.

At step S1220, the electronic device 100 determines a content displaying region 20 on an application execution screen. The electronic device 100 may determine the content displaying region by using information such as corner coordinates, width, and height of the content displaying region 20.

At step S1230, the electronic device 100 displays first written data on a second layer 220 disposed on the upper side of a first layer 210. At step S1240, the electronic device 100 displays second written data on a third layer 230 disposed on the upper side of the second layer 220. The first or second written data may be input from the user in a state where an application execution screen is displayed. Alternatively, the first or second written data may be written data pre-stored in a storage unit.

The layer on which the written data is displayed may be individually added or removed based on a user command. For example, when a user command is input for adding the second written data in the state where the application execution screen and the first written data are displayed, the third layer 230 may be generated and the second written data may be displayed thereon.

The electronic device 100 displays the input written data which is included in a region on which content is displayed on the second layer 220 or third layer 230. The second layer 220 or third layer 230 may be a transparent layer. Details regarding this are described in relation to FIGS. 4a and 4b and accordingly detailed description thereabout is omitted.

At step S1250, the electronic device 100 determines whether the content is enlarged or reduced. The content on the application execution screen displayed on the first layer may be enlarged or reduced according to a user command.

When the content is not enlarged or reduced, then the method is terminated. When the content is enlarged or reduced, then at step S1260 the first or second written data is enlarged or reduced based on the degree of magnification of the enlarged or reduced content, and displayed. Details regarding this are described in relation to FIGS. 5A and 5B, and accordingly detailed description thereabout is omitted.

The electronic device 100 determines whether the content is scrolled. When the content is scrolled, the electronic device 100 moves the first or second written data together with the scrolled content and displays the written data and the content. Details regarding this are described in relation to FIGS. 6A and 6B and accordingly detailed description thereabout is omitted.

When the written data is displayed on a plurality of layers, the written data displayed on each of the plurality of layers may be individually enlarged, reduced, scrolled, or edited.

The written data may be stored or displayed independently from the applications. For example, written data input in a state where a first application is executed may be displayed in the state where a second application, as well as the first application, is executed.

The electronic device 100 classifies and stores the input written data for each type of application or for each function provided by the applications. For example, the electronic device 100 stores the written data in association with the applications being executed when the written data is input. The plurality of written data may be stored for each type of application or for each function provided by the applications.

When a new application is executed, the electronic device 100 checks whether there is stored written data combined with the content of the new application and displays an object notifying that there is stored written data combined with the content of the application. The electronic device 100 displays the written data combined with the content of the executed application based on a user's command. The electronic device 100 may change the display of written data combined with the content of the executed application to display another written data combined with the content of the executed application. Details regarding this are described in relation to FIGS. 7A to 7C, and accordingly detailed description thereabout is omitted.

When a pre-stored written data is selected, the electronic device 100 executes an application which can be combined with the selected written data. In addition, the electronic device 100 displays an execution screen of the application on the first layer and displays the selected written data on the second layer. Details regarding this are described in relation to FIGS. 9A and 9B, and accordingly detailed description thereabout is omitted.

When a plurality of applications is executed, the electronic device 100 displays information on the written data combined with the content of each of the plurality of applications. For example, the electronic device 100 displays the number of the written data interworked with each of the plurality of applications. Details regarding this are described in relation to FIG. 10 and accordingly detailed description thereof is omitted.

The display method of an electronic device according to the above-described various embodiments may be implemented in a program executable in an electronic device. In addition, this program may be stored in various types of recording media and used.

In detail, program codes for performing the above-described methods may be stored in various type of nonvolatile recording media including a flash memory, a Read Only Memory (ROM), an Erasable Programmable ROM (EPROM), an Electronically Erasable and Programmable ROM (EEPROM), a hard disk, a removable disk, a memory card, a memory card, a USB memory, and a CD-ROM.

According to various embodiments of the present invention, content of an executed application and written data can be combined and displayed together. By equally adjusting the magnification of the content and the written data, the content and the written data remain combined in the same position relative to one another even when the content is enlarged or reduced. Additionally, by moving the content and the written data together, the content and the written data remain combined in the same position relative to one another, when the application screen is scrolled. In addition, written data can be effectively managed for each application.

While certain embodiments have been particularly shown and described above, it will be understood by one of ordinary skill in the art that various changes in form and details may be made therein without departing from the spirit and scope of the present inventive concept as defined by the following claims. The above-described embodiments should be considered in a descriptive sense only and not for purposes of limitation. Therefore, the scope of the inventive concept is defined not by the detailed description of embodiments but by the following claims and their equivalents, and all differences within the scope will be construed as being included in the present inventive concept.

What is claimed is:

1. An electronic device comprising:
an input device configured to receive written data from a user;
a memory;

a display; and a processor configured to, when an application is executed, check whether there is stored written data combined with the application in the memory;

when there is a plurality of written data combined with the application, display at least one object indicating the plurality of written data and an application execution screen of the application through the display;

in response to a first input for selecting the at least one object through the input device, display a first written data among the plurality of written data on the application execution screen, wherein when a magnification of the first written data and a magnification of the application execution screen do not match, adjust the magnification of the first written data and the magnification of the application execution screen to match;

in response to a second input for selecting the at least one object through the input device, display a second written data among the plurality of written data on the application execution screen, wherein when a magnification of the second written data and the magnification of the application execution screen do not match, adjust the magnification of the second written data and the magnification of the application execution screen to match, and wherein the application execution screen is displayed on a first layer, the first written data is displayed on a second layer disposed on an upper side of the first layer, and the second written data is displayed on a third layer disposed on an upper side of the second layer.

2. The electronic device according to claim 1, wherein the processor is further configured to display written data corresponding to a first region of the application execution screen except written data corresponding to a second region of the application execution screen, from among the first written data and the second written data, wherein the first region is a region on which content is displayed on the application execution screen and the second region is a region on which predetermined data is displayed on the application execution screen, and the first written data and the second written data is editable based on a user input to the content on the first region, and storable independently from the application.

3. The electronic device according to claim 2, wherein, when the content included in the application execution screen is scrolled, the processor is further configured to move the first written data or the second written data identically to the scrolled content and allow the first written data or the second written data to be displayed in the first region.

4. The electronic device according to claim 1, wherein the second layer and the third layer are both transparent layers.

5. The electronic device according to claim 1, wherein, when a user input is input for adding the second written data in a state where the application execution screen and the first written data are displayed, the processor is further configured to generate the third layer and display the second written data on the third layer.

6. A display method of an electronic device, comprising:

when an application is executed, checking whether there is stored written data combined with the application in a memory;

when there is a plurality of written data combined with the application, displaying an object indicating the plurality of written data through the display;

in response to a first input for selecting the object through the input device, displaying a first written data among the plurality of written data on an application execution screen of the application, wherein when a magnification of the first written data and a magnification of the application execution screen do not match, adjust the magnification of the first written data and the magnification of the application execution screen to match;

in response to a second input for selecting the object through the input device, display a second written data among the plurality of written data on the application execution screen, wherein when a magnification of the second written data and the magnification of the application execution screen do not match, adjust the magnification of the second written data and the magnification of the application execution screen to match, and wherein the application execution screen is displayed on a first layer, the first written data is displayed on a second layer disposed on an upper side of the first layer, and the second written data is displayed on a third layer disposed on an upper side of the second layer.

7. The display method according to claim 6, further comprising, displaying written data corresponding to a first region of the application execution screen except written data corresponding to a second region of the application execution screen, from among the first written data and the second written data, wherein the first region is a region on which content is displayed on the application execution screen and the second region is a region on which predetermined data is displayed on the application execution screen, and the first written data and the second written data are editable based on a user input to the content on the first region, and storable independently from the application.

8. The display method according to claim 7, wherein displaying, on the third layer of the display screen, written data included in the first region, from among second written data further includes, receiving the user input for adding the second written data in a state where the application execution screen and the first written data are displayed; and generating the third layer and displaying the second written data on the third layer.

9. The display method according to claim 6, further comprising, when content included in the application execution screen is scrolled, moving the first written data or the second written data identically to the scrolled content and displaying the moved first written data or second written data in the first displaying region.

10. The display method according to claim 6, wherein the second layer and the third layer are both transparent layers.

* * * * *